United States Patent [19]

Kuivala et al.

[11] Patent Number: 4,579,726
[45] Date of Patent: Apr. 1, 1986

[54] PROCESS AND APPARATUS FOR THE REMOVAL OF MERCURY FROM SULFUR DIOXIDE-BEARING HOT AND MOIST GASES

[75] Inventors: Aimo M. F. Kuivala, Kokkola; Jaakko O. Leppinen, Vammala; Jussi K. Poijärvi, Vanha-Ulvila; Jussi K. Rastas, Pori, all of Finland

[73] Assignee: Outokumou Oy, Outokumou, Finland

[21] Appl. No.: 628,819

[22] Filed: Jul. 9, 1984

Related U.S. Application Data

[63] Continuation of Ser. No. 362,240, Mar. 26, 1982, abandoned.

[30] Foreign Application Priority Data

Apr. 15, 1981 [FI] Finland .................................. 811173

[51] Int. Cl.$^4$ ........................ C01B 17/74; B01D 47/00
[52] U.S. Cl. .................................... 423/531; 423/210; 423/106; 423/544
[58] Field of Search ............... 423/522, 531, 533, 535, 423/210 M, 215.5, 106, 544

[56] References Cited

U.S. PATENT DOCUMENTS

| | | | |
|---|---|---|---|
| 940,595 | 11/1909 | Herreshoff | 423/215.5 |
| 1,627,977 | 5/1927 | Krafft | 423/522 |
| 3,677,696 | 7/1972 | Byrk et al. | 423/210 M |
| 3,838,190 | 9/1974 | Birke et al. | 423/210 M |
| 3,954,451 | 5/1976 | Kinoshita | 423/210 M |
| 3,974,254 | 8/1976 | Herkera et al. | 423/210 M |
| 4,194,889 | 3/1980 | Wanner | 423/215.3 |
| 4,208,192 | 1/1980 | Quigley et al. | 423/215.5 |
| 4,273,747 | 6/1981 | Rasmussen | 423/210 M |

*Primary Examiner*—Gary P. Straub
*Attorney, Agent, or Firm*—McCormick, Paulding & Huber

[57] ABSTRACT

Mercury is removed from sulfuric acid-bearing hot and moist smelting-plant or roasting-plant gases by cooling and scrubbing the hot gases by means of a concentrated sulfuric acid mist in order to sulfatize the mercury and to separate it from the gases. The cooling is carried out by vaporizing so much water or dilute sulfuric acid solution from the gases that the temperature of the gas drops to below the dew point, in order to produce a sulfuric acid mist which sulfatizes and washes the mercury, the gases being separated from the mist and directed to the sulfuric acid plant. The process can be carried out by means of nozzles installed in the pipe which feeds hot and moist sulfuric acid-bearing gases into the scrubbing tower of the sulfuric acid plant, water or acid obtained from the scrubbing tower being fed through the nozzles into the feed pipe in the form of a finely-divided mist.

3 Claims, 6 Drawing Figures

PROCESS AND APPARATUS FOR THE REMOVAL OF MERCURY FROM SULFUR DIOXIDE-BEARING HOT AND MOIST GASES

This application is a continuation of application Ser. No. 362,240, filed Mar. 26, 1982, now abandoned.

BACKGROUND OF THE INVENTION

The present invention relates to a process for the removal of mercury from sulfur dioxide-bearing hot and moist gases, especially roasting-plant or smelting-plant gases emerging from a hot electric filter, by cooling and scrubbing the hot gases by means of a strong sulfuric acid solution in order to sulfatize the mercury and to separate it from the gases.

Sulfidic concentrates of zinc and copper normally contain mercury from a few parts per million to a few hundred parts per million. In the roasting-plant and smelting-plant treatments of these concentrates, the mercury compounds decompose and the mercury is present in the gas in the form of metal vapor. In this case, the mercury sulfide of the concentrates reacts as follows:

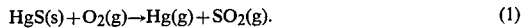
$$HgS(s) + O_2(g) \rightarrow Hg(g) + SO_2(g). \tag{1}$$

In the case of concentrates the mercury concentration of which is between 10 and 1000 g/t, the concentration of mercury in the corresponding gas phase is in the order of 5–500 mg/m$^3$ (0° C., 1 bar). After emerging from the roaster or smelting reactor, the gases are normally cooled in waste heat boilers and the dusts are removed in cyclones and electric filters.

During these stages, the temperature of the gas is in the order of 300°–350° C., at which the mercury is still in the gas phase. The SO$_2$-bearing gases produced in the roasting or smelting of sulfidic ores are generally used for the production of sulfuric acid. After the treatment stages described above, the gases are in this case directed through a scrubbing tower, an indirect cooling unit, a wet electric filter, a drying tower and a heat exchanger to a contact unit and an absorption tower. In the scrubbing tower the gases are scrubbed by means of 10–30% sulfuric acid, at which time the temperature of the gas drops to 40°–60° C. After indirect cooling and the filtration through a wet electric filter, the temperature of the gas is about 30° C. During these stages, part of the mercury passes out of the gas and remains in the scrubbing precipitates of the scrubbing towers. The remainder—usually most—of the mercury passes, in elemental form, together with the gas to a drying and absorption tower, in which it dissolves and then passes on into the produced acid. If it is assumed that the sulfidic concentrate contains mercury 100 g/t and that half of this amount is removed during the scrubbing stage, the produced acid contains mercury approx. 90 mg/l, i.e. approx. 50 g/t. Using the same calculation method it can be seen that a mercury concentration as low as 10 g/t in the concentrate is capable of increasing the concentration of mercury in the sulfuric acid to the order of 5 g/t. The uses of mercury-bearing sulfuric acid are limited. Standards have been set for the concentration of mercury in sulfuric acid, depending on the purpose for which the acid is used. Although maximum limits, prescribed by law, for the concentration of mercury in sulfuric acid have not yet been generally achieved, values of 1 g/t and 0.5 g/t have usually been proposed as such a limit; opinions have also been expressed that the limit should be lowered to a value as low as 0.2 g/t.

It is evident that such low concentrations of mercury in sulfuric acid will not be obtained for sulfuric acid produced from the SO$_2$ gases of zinc-roasting plants and copper-smelting plants, unless the gas, or alternatively the produced sulfuric acid, is purified with respect to mercury.

Previously known is a mercury removal process in which the gas emerging from a hot electric filter is scrubbed by means of a 85–93% sulfuric acid solution. The temperature of the cycled sulfuric acid solution, saturated with metal sulfates and other metal salts, is adjusted during the scrubbing stage by means of the circulation rate of the solution and by means of external heat exchange, usually to 160°–220° C. In this case, practically all of the mercury present in the inlet gas is sulfatized, and the concentration and temperature of the sulfuric acid solution can be adjusted, within the above-mentioned ranges of concentration and temperature, to such levels that the partial pressure of water vapor in the sulfuric acid solution during the scrubbing stage is the same as the partial pressure of water vapor in the gas which is being scrubbed, whereby the concentration of the cycled sulfuric acid solution remains constant.

When the cycled sulfuric acid solution is saturated as regards mercury salts and other—typical of each system—metallic salts (metals present in the dust), these salts crystallize out continuously from the cycled sulfuric acid solution. The total solubility in sulfuric acid of mercury and the metals present in the dust is in the order of a few grams per liter. The solid material which is salted out is separated from the cycled sulfuric acid solution. The separated precipitate is washed, whereby the sulfuric acid and most of the metal salts present in it dissolve and the mercury remains in the final precipitate. The final precipitate usually consists of the compound Hg$_3$Se$_2$SO$_4$; the scrubbed gases normally contain selenium in the form of selenium oxide, which in a cycled, SO$_2$-gas saturated and mercury sulfate-bearing sulfuric acid reaches the selenite degree and forms the above-mentioned compound with mercury and sulfate. If the amount of selenium present is small, HgSO$_4$ is also produced. The mercury and the selenium are separated from the precipitate and recovered.

The process for the removal of mercury discussed above is described in Finnish Pat. No. 45 767, and the recovery of mercury and selenium is described in Finnish Pat. No. 48 708. The process is also described in the article by A. Kuivala, J. Poijärvi, "Sulphuric acid washing removes mercury from roaster gases" E/MJ —October 1978, 81–84. When the cycled sulfuric acid solution is saturated as regards mercury salts and other—typical of each system—metallic salts (metals present in the dust), these salts crystallize out continuously from the cycled sulfuric acid solution. The total solubility in sulfuric acid of mercury and the metals present in the dust is in the order of a few grams per liter. The solid material which is salted out is separated from the cycled sulfuric acid solution. The separated precipitate is washed, whereby the sulfuric acid and most of the metal salts present in it dissolve and the mercury remains in the final precipitate. The final precipitate usually consists of the compound Hg$_3$Se$_2$SO$_4$; the scrubbed gases normally contain selenium in the form of selenium oxide, which in a cycled, SO$_2$-gas saturated and mercury sulfate-bearing sulfuric acid reaches the selenite degree The gas emerging from the dry electric filter, the temperature of the gas being approx. 350° C., is washed by means of a sulfuric acid solution cycled in a sulfatizing tower and cooled in a heat exchanger. The temperature of the gas drops to approx. 180° C. The mercury present in the gas is sulfatized, the sulfur trioxide and the selenium dioxide remain in the cycled acid, the water vapor, the hydrogen chloride and the hydrogen fluoride pass through the tower. The $SO_2$ gas emerging from the sulfatizing tower contains also a considerable amount of sulfuric acid, in addition to water vapor, hydrogen chloride and hydrogen floride. The gas is now scrubbed using an approximately 50% sulfuric acid solution, which is cooled in a heat exchanger. The temperature of gas drops to approx. 50° C. The water vapor, the hydrogen chloride and the hydrogen fluoride pass through the tower, but most of the sulfuric acid remains in the tower. Finally, the gases are further scrubbed using a 5-10% sulfuric acid solution. The temperature of the gas drops at this stage to 30° C. The hydrogen chloride, the hydrogen fluoride, the remainder of the sulfuric acid and part of the water remain in the tower. The gas continues its journey from the electric filter to the drying tower and from there on to the contact unit and the absorption tower.

By this known method, mercury can be removed from gas very effectively, but the price of this comprises the capital outlay for the sulfatizing tower and its accessories, as well as the expenses of the operation of the process. When the question has been of removing mercury from the gases emerging from zinc-roasting plants and copper-smelting plants, companies have usually not been willing to make considerable investments. This is the most important reason why the use of the mercury removal processes has not become widespread in these connections.

The central unit of the above-mentioned mercury removal process, known per se, is the sulfatizing tower and its accessories. In the further development of the process, special attention must be paid to ways in which this unit can be simplified and in which capital outlays for it can be minimized.

SUMMARY OF THE INVENTION

According to the present invention the sulfur dioxide-bearing hot and moist gases are cooled by vaporizing in the gases such an amount of water or dilute sulfuric acid solution that the temperature of the gas drops to below its dew point in order to produce a sulfuric acid mist which sulfatizes and washes out the mercury.

If we examine the sulfatizing of mercury under the conditions of the sulfatizing tower, the following reactions can be regarded as possible sulfatizing reactions:

$$Hg(g)+2SO_3(g)\rightleftharpoons HgSO_4(s)+SO_2(g) \quad (2)$$

$$Hg(g)+2H_2SO_4(g)\rightleftharpoons HgSO_4(s)+SO_2(g)+H_2O(g) \quad (3)$$

$$Hg(g)+2H_2SO_4(\ldots)\rightleftharpoons HgSO_4(s)+SO_2(g)+H_2O(g) \quad (4)$$

In Reaction Equation (4), ( . . . ) represents sulfuric acid solution under the conditions of the sulfatizing tower, i.e. a sulfuric acid solution having a sulfuric acid concentration of 85-93% and a temperature of 160°-220° C.

Experiments have shown that when $SO_3$ gas is introduced into a dry $SO_2$—$O_2$—$N_2$ gas mixture which contains elemental mercury at about 200° C., the mercury is sulfatized immediately. If, on the other hand, the gas mixture in question is moist—as the gases from zinc smelting plants and copper smelting plants usually are, in which case the equilibrium in the reaction $$H_2O(g)+SO_3(g)\rightleftharpoons H_2SO_4(g) \quad (b\ 5)$$

within the temperature range 160°-200° C. is strongly leaning to the right—experiments show that sulfatizing through Reaction (3) is so slow that it cannot with ease be exploited technically. If a sulfuric acid solution phase, i.e. phase (...), is present in the last-mentioned gas mixture, experiments show that Reaction (4) at the interface of phase (...) is rapid.

On the basis of these results there is reason to assume that in a sulfatizing tower Reaction (4) is the predominant reaction in the sulfatizing of mercury. It is also evident that the simplication of the process must be based on Reaction (4).

The following theoretical experiment is examined in order to explain the central principle of the present invention. It is assumed that a spherical gas bubble rises through sulfuric acid solution in a gas scrubbing flask. The composition of the gas in the bubble corresponds to the composition of a mercury-bearing roaster gas and the conditions in the sulfuric acid solution phase correspond to the conditions in the corresponding phase in a sulfatizing tower, i.e. concentration approx. 90% and temperature approx. 180° C. It is assumed that Reaction (4) at the interface between the gas bubble and the sulfuric acid solution is very rapid. If it is assumed that no convection appears in the gas bubble, the diffusion of gaseous mercury in the bubble determines the rate at which the gaseous mercury is removed from the gas phase of the bubble, i.e. the rate at which it diffuses along the phase interface gas/sulfuric acid solution and reacts there immediately according to Reaction (4) and passes into the sulfuric acid solution phase. The diffusion coefficient D of the gaseous mercury under the conditions involved is of the order $D=0.1-0.3\ cm^2/s$. If it is assumed that the travel time of the gas bubble in the sulfuric acid solution is 1 s, calculations show that even in a bubble with a diameter as great as $d=1.0-1.5$ cm the degree of sulfatizing is approx. 99%.

The above examination shows that for rapid sulfatizing of the gaseous mercury it is essential that a maximal area of sulfuric acid solution interface is obtained. This can be achieved by, for example, creating a finely-divided sulfuric acid solution mist in the gas phase. The composition of the gas phase can be exploited for this purpose. Roasting-plant and smelting-plant gases emerging from a hot electric filter contain some amount of sulfur trioxide. Since the gases are moist, according to the present invention a sulfuric acid mist can be produced in the gas phase by cooling the gases to below their dew point, i.e. below the temperature at which the sulfur trioxide and water vapor present in the gas phase condense as a sulfuric acid mist. The temperature in question naturally depends on the concentrations of sulfur trioxide and water vapor in the gas phase. For example, for roasting-plant gases the dew point is usually somewhat below 200° C. When, in accordance with the present invention, either water or a dilute sulfuric acid solution is fed into the gas phase, the dew point of roasting-plant and smelting-plant gases can be easily adjusted within, for example, a temperature range of 160°-220° C.

According to the present invention, a gas phase having a temperature of 300°–350° C. upon emerging from a hot electric filter is cooled to below the dew point of sulfuric acid, i.e. approximately to a temperature range of 160°–220° C., by atomizing into the gas phase water or a sulfuric acid solution (5–50%) as a finely-divided mist. In order to achieve rapid (1–2 s) cooling of the gas from 300°–350° C. to 160°–220° C., the mist of water or sulfuric acid solution must be sufficiently finely-divided. Calculations and experiments show that when the drop size is less than 100–200 μm, the cooling time of the gas is less than 1 s. Thus, no extraneous cooling involving outlays of capital is necessary, but the cooling is achieved by binding the heat of the gas in the heat of vaporization of the liquid fed into it, and this heat can be recovered afterwards in the scrubbing towers of the sulfuric acid plant.

On the other hand, it is important for rapid sulfatizing of mercury that the sulfuric acid mist produced is finely-divided so that the diffusion distances of the gaseous mercury from the gas phase to the phase interface of a sulfuric acid drop will be sufficiently short. Calculations show that, when the reaction time, or diffusion time, is in the order of 1 s, the distance between the drops may be approx. 1 cm, and furthermore, the drop size may in this case be an ample 100 μm. If the drop size decreases, the distance between the drops decreases and, respectively, the reaction time required by the sulfatizing also decreases.

In a preferred embodiment of the present invention, after the roasting-plant or smelting-plant gases emerge from a hot electric filter—at which time the temperature of the gas is usually between 300° and 350° C.— there is fed into the gases water or sulfuric acid solution (5–50%), or preferably scrubbing acid (20–50%) from the scrubbing tower in the form of a finely-divided mist, the drop size of which is for the major part less than 100–200 μm, in such an amount (approx. 0.1 l/m$^3$.h) that the temperature of the gas drops to below the dew point of sulfuric acid, i.e. in general to a temperature range of 160°–220° C. Thereby a finely-divided sulfuric acid mist is formed in the gas; this gas, in accordance with Reaction (4), rapidly sulfatizes the mercury present in elemental form in the gas. The gas is advantageously fed finally—before being fed into the scrubbing tower of the sulfuric acid production plant—through a set of surfaces consisting of uncorrugated or corrugated sheets positioned according to the gas flow direction; the distances between the sheets can be, for example, 2–3 cm and their length 1–4 m. The sheet surfaces are kept moist with sulfuric acid, and they are prevented from getting clogged with dust by spraying scrubbing acid from the scrubbing tower throuht the set of surfaces from time to time. The formed solid and the excess sulfuric acid pass into the scrubbing tower.

DESCRIPTION OF THE PREFERRED EMBODIMENTS

Figure 1:
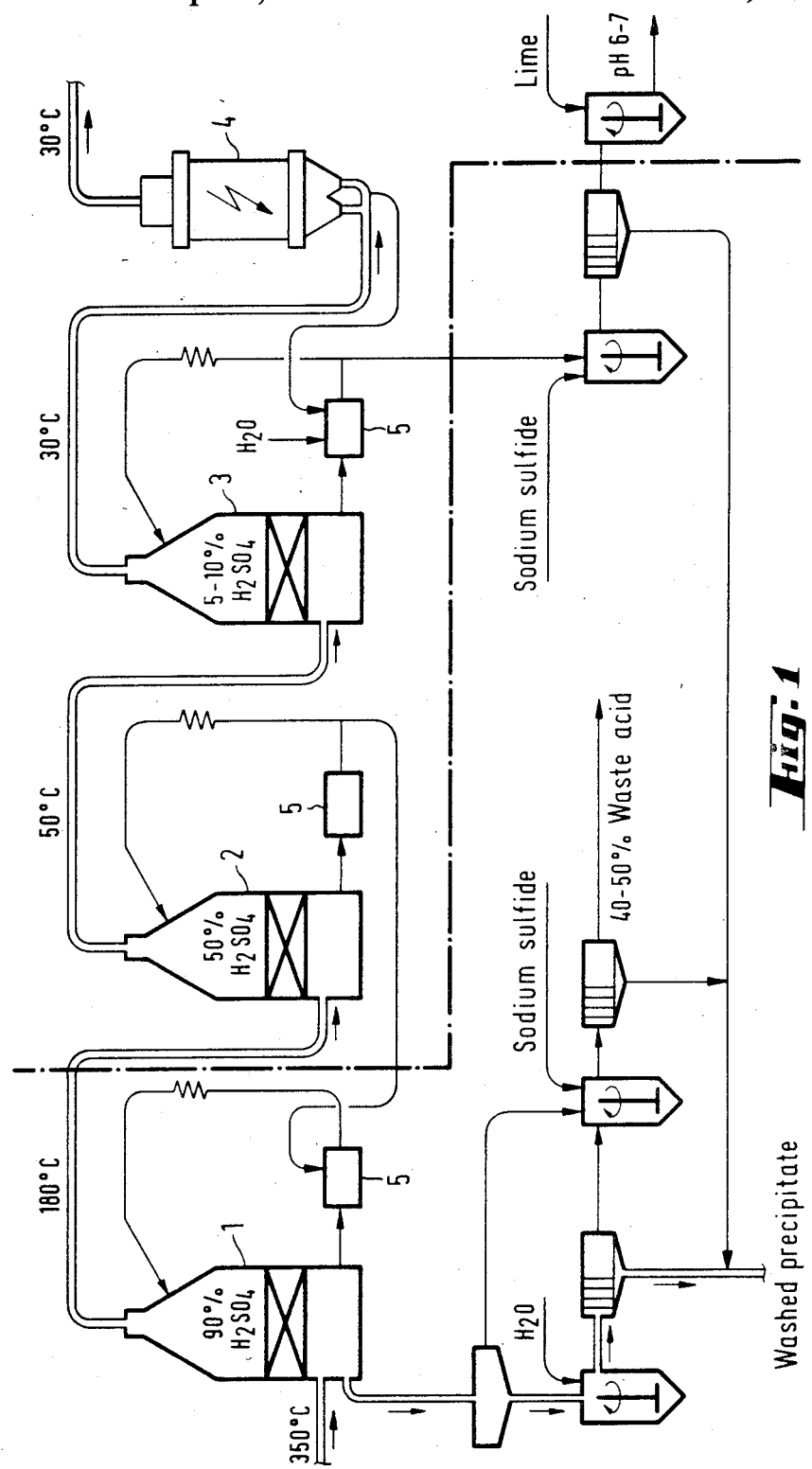
FIG. 1 depicts the flow diagram of a prior known process for the removal of mercury, connected to the scrubbing towers of a sulfuric acid plant.

In FIG. 1 the sulfatizing tower of a mercury removal process known per se is indicated by numeral 1. The cooled gases, freed from mercury, are directed from the sulfatizing tower 1 to the scrubbing tower 2 of the sulfuric acid plant, in which the gas is scrubbed by means of a cycled 50% sulfuric acid solution, and to a halogen tower 3, in which the gases are further scrubbed by means of a cycled 10% sulfuric acid solution, whereafter the gases can be directed to a wet electric filter 4. The cycled acid is cooled indirectly in heat exchangers 5 outside the sulfatizing tower 1, the washing tower 2 and the halogen tower 3. The actual process for the removal of mercury is separated by a dotted line from the washing tower 2, the halogen tower 3 and the wet electric filter 4, which all belong to the sufuric acid plant. The object of the present invention is now to replace the sulfatizing tower of the mercury removal process depicted in FIG. 1 and the cooling unit 5 for cycled acid which is linked to it by a simpler and thus less expensive unit.

Figure 2:
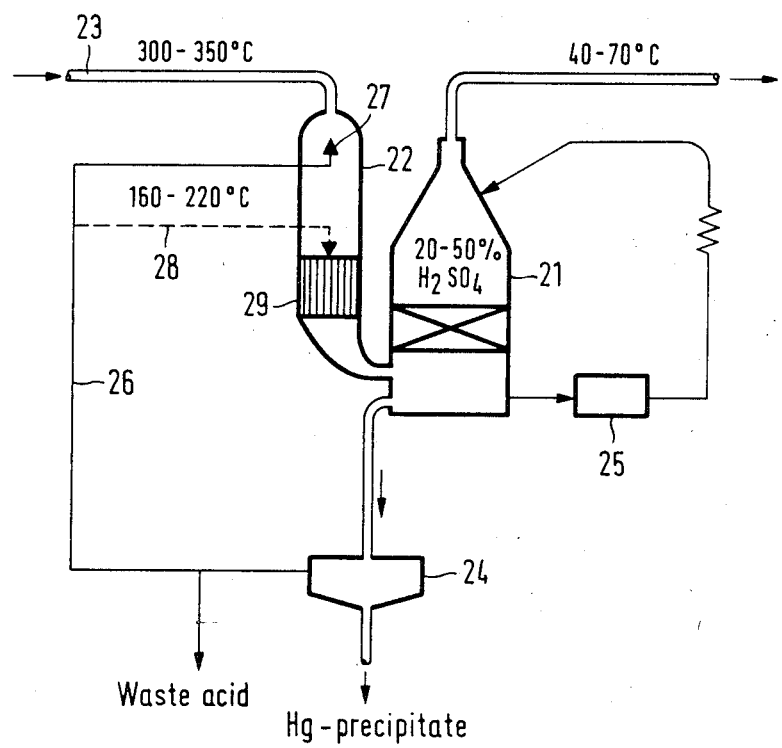
FIG. 2 depicts a sectioned side elevation of a preferred embodiment of the invention, connected to the first scrubbing tower of a sulfuric acid plant.

Such a simpler and less expensive unit is shown in FIG. 2, in which the chamber 22 is connected to the feeding point 23 for hot and moist sulfuric acid-bearing gases at a point before the scrubbing tower 21 of the sulfuric acid plant; nozzles 27 have been installed in the upper part of the chamber 22 in order to return part of the cycled acid, obtained from the scrubbing tower 21 and separated from the mercury precipitate in the settler 24, to the nozzles 27 through the pipe 26 and to atomize it as finely-divided drops into the hot and moist sulfur dioxide-bearing gases, in order to cool these gases to a temperature below their dew point in order to form a mist of sulfuric acid in the chamber 22. In-this mist the mercury present in the gases is sulfatized effectively and is separated by means of a set of surfaces 29 situated in the chamber 22 below the nozzles 27, the set of surfaces comprising several vertical corrugated sheets fitted at intervals from each other, the surfaces of the sheets being maintained moist with sulfuric acid solution. In order to prevent the set of surfaces 29 from getting clogged, there branches out from the return acid pipe 26 a pipe 28 which extends to inside the chamber 22 to above the set of surfaces 29 in order to spray scrubbing acid from the scrubbing tower 21 through the set of surfaces 29 from time to time. The liquid phase and the solution phase are directed from the lower end of the chamber 22 directly to the lower part of the scrubbing tower 21.

The phenomena on which the invention is based were clarified with the following experiments.

EXPERIMENT 1

Figure 3:
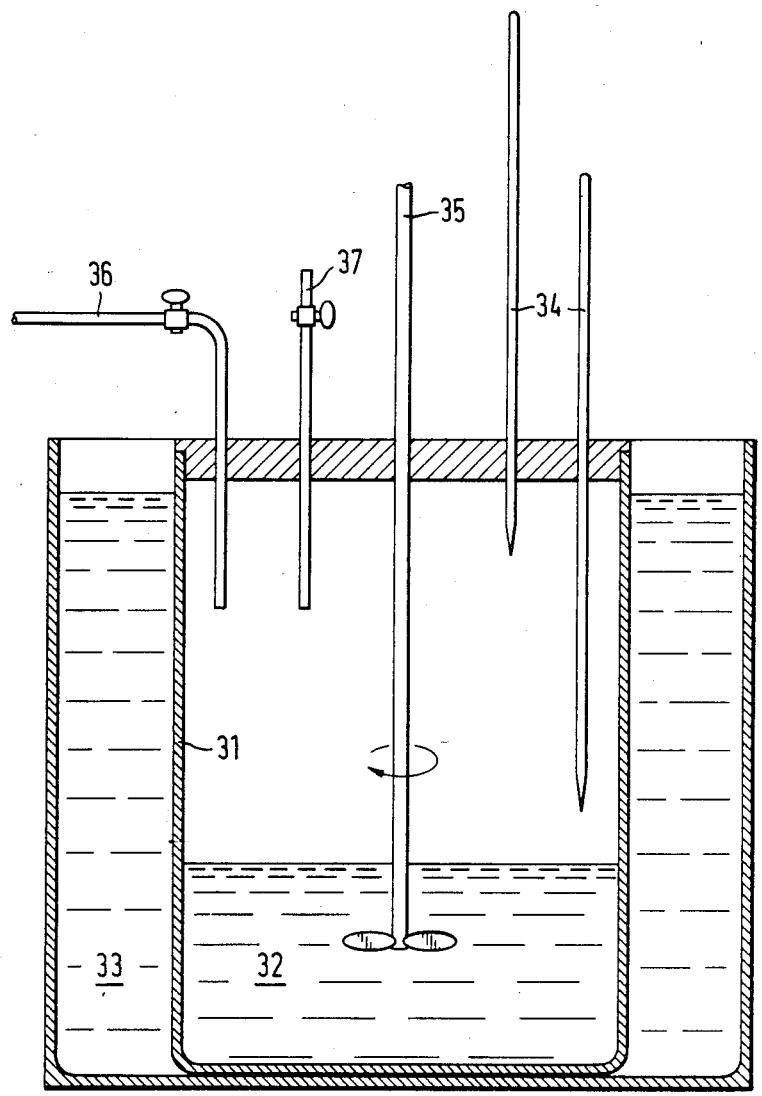
FIG. 3 depicts a sectioned side elevation of the experimental apparatus used in the experiments described below to study the diffusion of mercury in the gas phase.

The diffusion of mercury in the gas phase was examined using the experimental apparatus according to FIG. 3.

The experimental apparatus consists of a gas-tight glass reactor 31 having a volume of 1.5 dm$^3$. To the glass reactor 31 there are connected thermometers 34, a stirring device 35, a mercury inlet pipe 36, and an analysis sample pipe 37, and the glass reactor 31 is placed in a thermostat-controlled glycerol bath 33. At the bottom of the reactor 31 there was placed 90% H$_2$SO$_4$ solution in such a manner that the gas space was 1 dm$^3$. When the H$_2$SO$_4$ solution was saturated with a SO$_2$—N$_2$—O$_2$ mixture, the gas space contained 10% SO$_2$, 16.8% O$_2$, 63.2% N$_2$ and 10% water vapor. The temperature was 180° C. Then mercury vapor was introduced into the reactor and the concentration of mercury in the gas phase was observed and plotted as a function of time. The following values were obtained in the experiment:

| Time(s) | Concentration of mercury in gas (μg/l) | Amount of mercury in gas (%) |
| --- | --- | --- |
| 1 | 112 | 100 |
| 15 | 90 | 80 |
| 60 | 39 | 35 |
| 120 | 13 | 12 |
| 300 | 3.5 | 3.1 |

Figure 4:
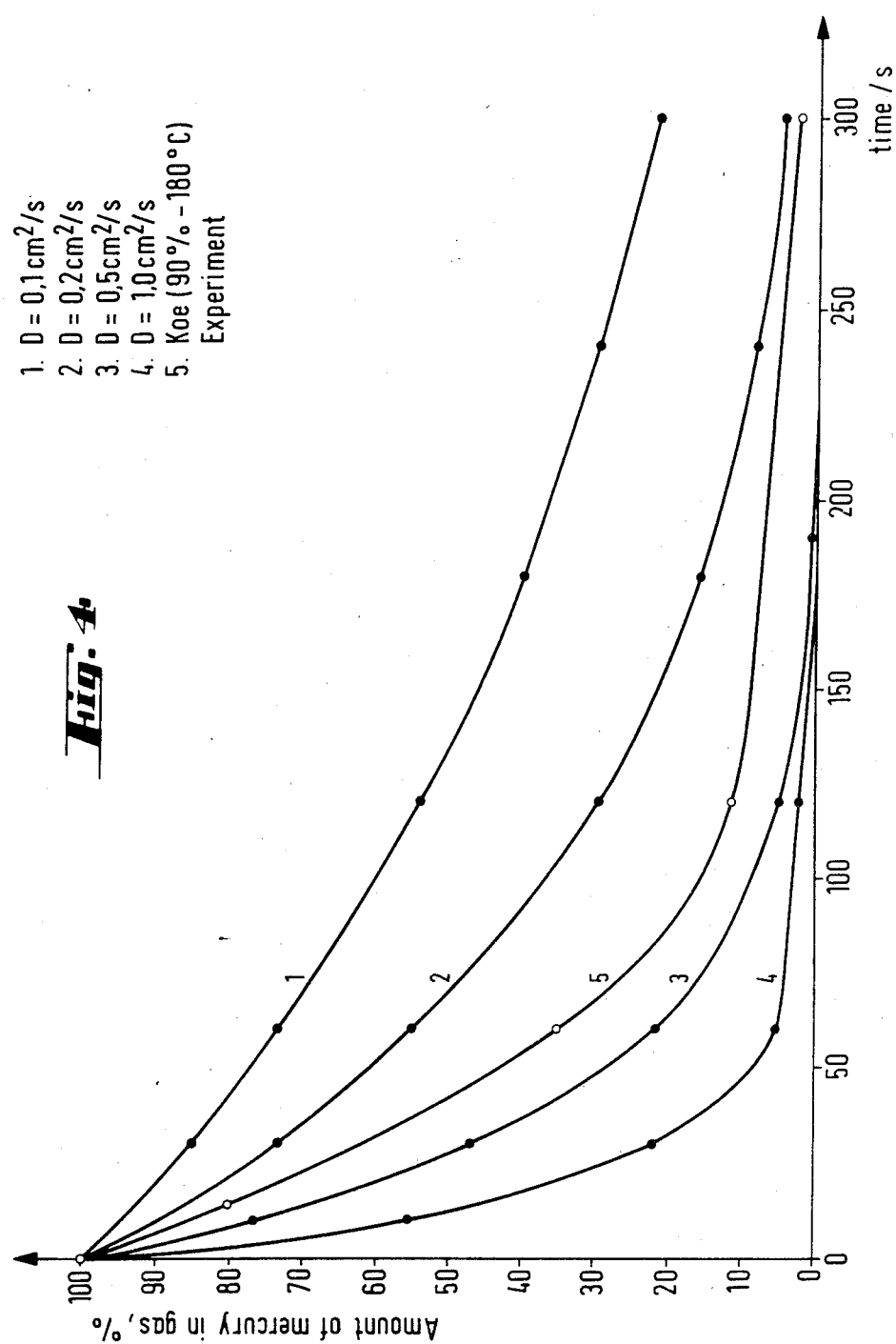
FIG. 4 depicts the percentage of mercury in the gas as a function of time, and in the figure the test result is compared with the theoretical values obtained using different diffusion coefficients, in FIG. 5 the test results obtained at different sulfuric acid concentrations and at different temperatures are compared with each other by depicting the percentage of mercury in the gas graphically as a function of time.

In FIG. 4 the obtained experimental result is compared with the theoretical values obtained using diffusion coefficient values of 0.1 cm$^2$/s, 0.2 cm$^2$/s, 0.5 cm$^2$/s and 1.0 cm$^2$/s. It can be seen from FIG. 4 that the experimental result is between diffusion coefficients 0.2 cm$^2$/s and 0.5 cm$^2$/s.

The diffusion coefficient can also be estimated for the system Hg-air at a temperature of 180° C. Even though the mixture present in roaster gases is SO$_2$—O$_2$—N$_2$, for purposes of estimation there is no substantial difference when the gas is air. The following equation[1] is used for $$D_G = \frac{BT^{3/2}\sqrt{1/M_1 + 1/M_2}}{Pr_{12}^2 I_D}, \text{ where}$$

where
$D_G$ = diffusion coefficient (cm$^2$/s)
T = temperature (K)
M$_1$ and M$_2$ = molecular weights of gases (g/mol)
p = total pressure (atm)

$$B = (10.7 - 2.46\sqrt{1/M_1 + 1/M_2}) \cdot 10^{-4}$$

$$r_{12} = \frac{(r_0)_1 + (r_0)_2}{2},$$

where
$r_o = 1.18 V_o^{\frac{1}{3}}$
$V_o$ = molar volume of the solution at boiling point cm$^3$/mol(table value)
$I_D = f(kT/E_{12})$ diffusion impingement integral $$\frac{E_{12}}{k} = \sqrt{\left(\frac{E_1}{k}\right)\left(\frac{E_2}{k}\right)},$$

where
E$_{12}$ = molecular interaction energy (erg)
k = Boltzmann's constant = 1.38·10$^{-6}$ erg/k

[1] Perry, J., Chemical Engineers Handbook, Mc Graw-Hill Inc., New York, 1963, 14–20, 14–21.

The values for E$_1$/k and E$_2$/k and the dependence of I$_D$ on kT/E$_{12}$ are obtained from tables. By substituting the values in the equations above, the diffusion coefficient obtained for the system Hg-air is:

D$_G$ = 0.33 ± 0.07 cm$^2$/s

The value corresponds closely to the experimental result, which is shown in FIG. 4.

EXPERIMENT 2

The importance of the concentration of sulfuric acid and the temperature in the sulfatizing of mercury was studied using the apparatus according to FIG. 3, but in such a manner that the gas phase was also stirred by means of teflon blades. When the temperature was 120° C. and the sulfuric acid concentration was 90%, the following results were obtained:

| Time(s) | Concentration of mercury in the gas (μm/l) | Amount of mercury in the gas (%) |
| --- | --- | --- |
| 0 | 85 | 100 |
| 15 | 82 | 96 |
| 60 | 78 | 92 |
| 120 | 74 | 87 |
| 300 | 28 | 33 |

Respectively, when the sulfuric acid concentration is 90% and the temperature is 150° C., the following results are obtained:

| Time(s) | Concentration of mercury in the gas (μm/l) | Amount of mercury in the gas (%) |
| --- | --- | --- |
| 0 | 60 | 100 |
| 15 | 50 | 83 |
| 60 | 26 | 43 |
| 120 | 9 | 15 |
| 300 | 0.4 | 0.7 |

When the sulfuric acid concentration is 90% and the temperature is 200° C., the following values are obtained:

| Time(s) | Concentration of mercury in the gas (μg/m$^3$) | Amount of mercury in the gas (%) |
| --- | --- | --- |
| 0 | 75 | 100 |
| 15 | 54 | 72 |
| 60 | 16 | 21 |
| 120 | 2 | 2.7 |
| 300 | 0 | 0 |

The sulfuric acid concentration is 85% and the temperature is 150° C., the following values are obtained:

| Time(s) | Concentration of mercury in the gas (mg/m³) | Amount of mercury in the gas (%) |
|---|---|---|
| 0 | 84 | 100 |
| 15 | 78 | 93 |
| 60 | 61 | 73 |
| 120 | 39 | 45 |
| 300 | 8 | 9.5 |

When the sulfuric acid concentration is 95% and the temperature is 210° C., the following results are obtained:

| Time(s) | Concentration of mercury in the gas (mg/m³) | Amount of mercury in the gas (%) |
|---|---|---|
| 0 | 83 | 100 |
| 15 | 50 | 60 |
| 60 | 8 | 9.6 |
| 120 | 1.3 | 1.6 |
| 300 | 0 | 0 |

Figure 5:
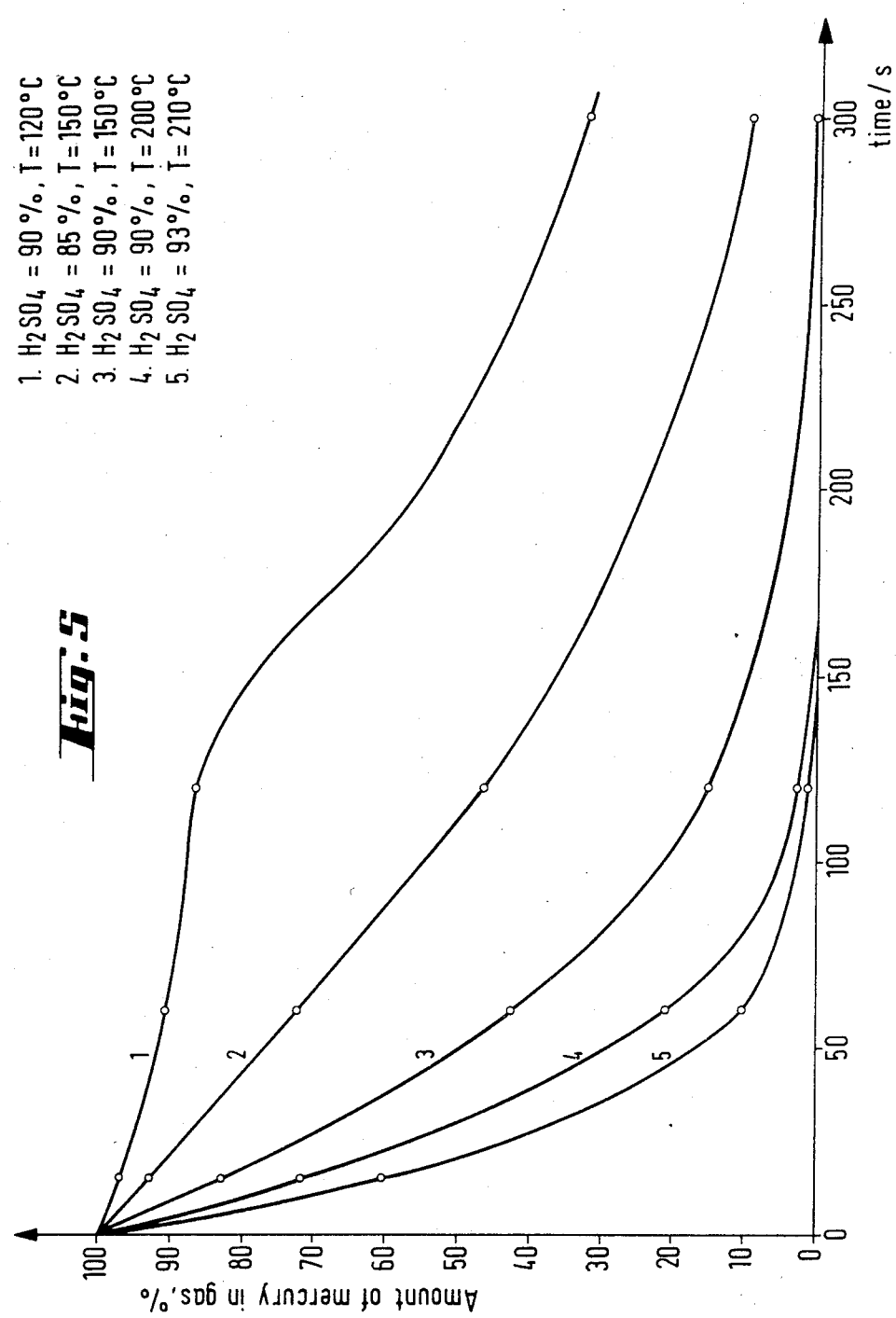

The above results are presented graphically in FIG. 5.

EXAMPLE 1

The removal of mercury was also studied in a full-scale process by carrying out the following changes: the normal cycling of 90% sulfuric acid in the sulfatizing tower 41 was eliminated, but instead the gases were cooled by spraying water via the nozzles 42 installed in the pipe prior to the tower 41. A bed formed of ceramic rings was left in the tower 41. The temperature and the concentration of mercury in the gas were especially observed during the trial run. The trial run system and the most essential items measured are shown in FIG. 6.

Figure 6:
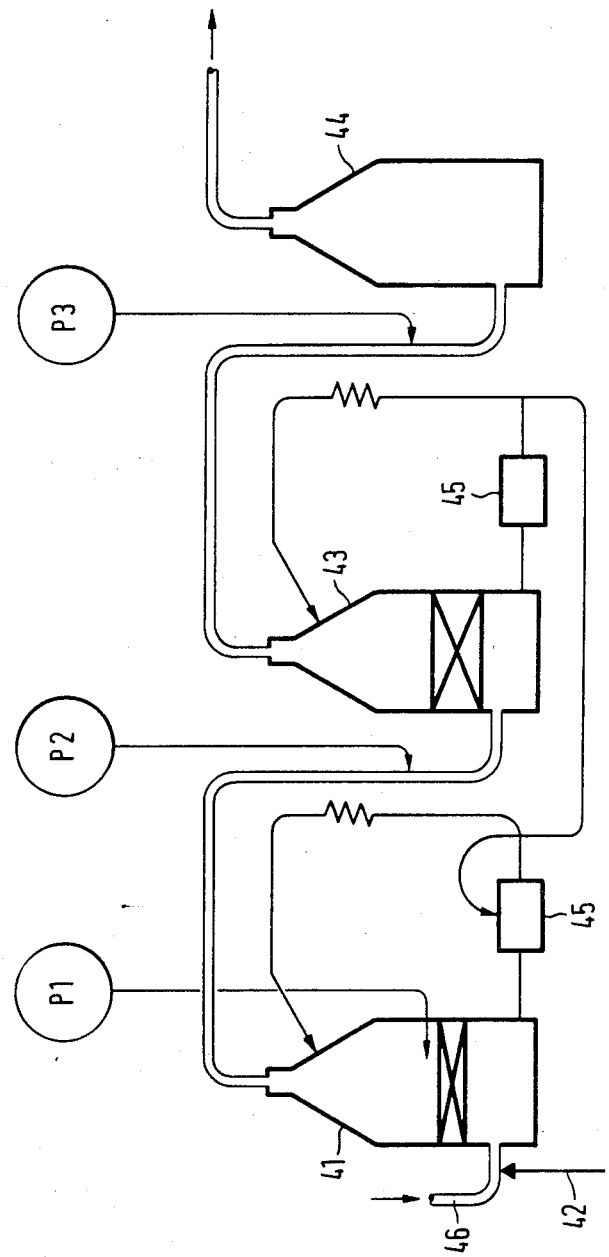
FIG. 6 is a diagrammatic representation of the full-scale processing apparatus used in the example.

In FIG. 6, the sulfatizing tower 41, the dilute acid tower 43 and the drop separation tower 44 are coupled in series in the gas flow direction. The pipe for feeding hot and moist sulfur dioxide-bearing gases is indicated by numeral 46, the pipe opening into the sulfatizing tower 41, and the water nozzles installed in the pipe are indicated by 42. The return acid cooling devices are indicated by 45.

Roaster gases ($V_n = 50,000$ m³/h) were cooled in the feed pipe 46 by spraying water by means of pneumatic nozzles 42 (6 of them) at 5 m³/h. At this time the water pressure was 4.3 bar and the air pressure 3.4 bar. The temperature was 325° C. prior to cooling, 193° C. at point $P_1$, 183° C. at point $P_2$, and 74° C. at point $P_3$. The concentration of mercury in the gas was 40 mg/m³ prior to the cooling and 3.5 mg/m³ at point $P_3$. The removal of mercury in this case was over 90%.

EXAMPLE 2

Roaster gases were cooled in a system according to Example 1, water being fed at 4.5 m³/h. The cooling was further promoted by cycling about 90% tower acid in pulses at 30-minute intervals. The duration of a pulse was 30 s, in which case the consumption of sulfuric acid solution was approx. 300 l. Results are shown below of such an experiment stage during 3 h 15 min.

| Time h min | Feed analysis | $T(P_1)$ °C. | $T(P_2)$ °C. | Concentration of mercury in the gas at $P_3$ mg/m³ |
|---|---|---|---|---|
| 0 00 | feed | 164 | 172 | not measured |
| 0 30 | feed | 172 | 175 | not measured |
| 0 35 | analysis | 182 | 178 | 1.5 |
| 0 45 | analysis | 190 | 182 | 2.1 |
| 1 00 | feed | 174 | 176 | not measured |
| 1 30 | feed | 182 | 177 | not measured |
| 1 40 | analysis | 188 | 180 | 2.0 |
| 1 50 | analysis | 193 | 184 | 3.1 |
| 2 00 | feed | 179 | 174 | not measured |
| 2 30 | feed | 174 | 176 | not measured |
| 3 00 | feed | 178 | 184 | not measured |
| 3 05 | analysis | 187 | 180 | 0.5 |
| 3 15 | analysis | 196 | 175 | 1.4 |

In the case presented above, the concentration of mercury in the gases was 44 mg/m³ prior to the cooling, in which case the removal of mercury was 93–99%.

What is claimed is:

1. A process for the removal of mercury from sulfur dioxide-bearing hot and moist gases from ore roasting or smelting by cooling and scrubbing the hot gases in order to sulfatize the mercury and to separate it from the gases, which consists essentially of directly cooling said sulfur dioxide-bearing hot and moist gases containing also some amount of sulfur trioxide by vaporizing in the gases water or 5–50% dilute sulfuric acid solution to reduce the temperature of the gas to 160° C. and to or below its dew point to produce a sulfuric acid mist with an acid concentration of 85–93% which sulfatizes and separates the mercury and then separating the mist and sulfated mercury from the gas stream.

2. The process according to claim 1, in which water or dilute sulfuric acid solution is fed in the form of a finely-divided mist into the sulfur dioxide-bearing hot and moist gases, the drop size in the mist being primarily below 200 μm.

3. The process according to claim 1, in which the gas containing sulfuric acid mist is caused to flow through a set of surfaces moistened with sulfuric acid solution, in order to separate the sulfuric acid mist drops from the gas.

* * * * *

UNITED STATES PATENT AND TRADEMARK OFFICE
CERTIFICATE OF CORRECTION

PATENT NO. : 4,579,726
DATED : April 1, 1986
INVENTOR(S) : Kuivala et al.

It is certified that error appears in the above—identified patent and that said Letters Patent is hereby corrected as shown below:

On the face of the patent, after "Inventors:" change the spelling of the third listed inventor's name from "Jussi K. Poijärvi" to--Jaakko T. I. Poijärvi--;

after "Assignee:" change the spelling of the Assignee from "Outokumou Oy" to--Outokumpu Oy--and change the spelling of the name of the domicile of the Assignee from "Outokumou" to--Outokumpu--.

Signed and Sealed this

Fourteenth Day of March, 1989

*Attest:*

DONALD J. QUIGG

*Attesting Officer*  *Commissioner of Patents and Trademarks*